US012191064B2

(12) United States Patent
Voiron et al.

(10) Patent No.: US 12,191,064 B2
(45) Date of Patent: *Jan. 7, 2025

(54) NANOMAGNETIC INDUCTOR CORES, INDUCTORS AND DEVICES INCORPORATING SUCH CORES, AND ASSOCIATED MANUFACTURING METHODS

(71) Applicant: Murata Manufacturing Co., Ltd., Nagaokakyo (JP)

(72) Inventors: Frédéric Voiron, Barraux (FR); Mohamed Mehdi Jatlaoui, Colleville-Montgomery (FR); Julien El Sabahy, Grenoble (FR)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,290

(22) Filed: Feb. 15, 2024

(65) Prior Publication Data

US 2024/0186052 A1 Jun. 6, 2024

Related U.S. Application Data

(63) Continuation of application No. 17/684,950, filed on Mar. 2, 2022, now Pat. No. 11,948,719, which is a (Continued)

(30) Foreign Application Priority Data

Sep. 30, 2019 (EP) .................................... 19306244

(51) Int. Cl.

*H01F 27/24* (2006.01)
*H01F 27/28* (2006.01)
*H01F 41/02* (2006.01)

(52) U.S. Cl.

CPC ............. *H01F 27/24* (2013.01); *H01F 27/28* (2013.01); *H01F 41/0206* (2013.01)

(58) Field of Classification Search

CPC ............... H01F 1/0063; H01F 17/0006; H01F 17/0033; H01F 27/28; H01F 27/24; H01F 41/0206; H01F 41/046

(Continued)

(56) References Cited

U.S. PATENT DOCUMENTS

| | | | | |
|---|---|---|---|---|
| 2009/0155617 | A1* | 6/2009 | Kim | B82Y 25/00 428/629 |
| 2011/0171137 | A1* | 7/2011 | Patolsky | C25D 5/627 216/37 |
| 2016/0268144 | A1 | 9/2016 | Voiron et al. | |

FOREIGN PATENT DOCUMENTS

| | | | |
|---|---|---|---|
| EP | 1925696 | A2 | 5/2008 |
| EP | 1925696 | A3 | 2/2010 |

(Continued)

OTHER PUBLICATIONS

International Search Report issued for PCT/IB2020/059035, date of mailing Dec. 7, 2020.

(Continued)

*Primary Examiner* — Kevin J Comber

(74) *Attorney, Agent, or Firm* — ArentFox Schiff LLP

(57) ABSTRACT

A nanomagnetic inductor core that includes: a porous, electrically-insulating template having high-permeability material in the pores thereof to constitute elongated nanowires, and wherein the elongated nanowires are segmented along their axial direction; and a segment of dielectric material interposed between adjacent segments of the high-permeability material along the axial direction of the nanowire; wherein each segment of the high-permeability material has a length, in the axial direction of the nanowire, no greater than a size of a single magnetic domain, and wherein a maximal cross-sectional dimension of the nanowire is no greater than the size of the single magnetic domain. Inductors and LC interposers using such nanomagnetic inductor cores, as well as associated fabrication methods.

15 Claims, 12 Drawing Sheets

Related U.S. Application Data continuation of application No. PCT/IB2020/059035, filed on Sep. 28, 2020.

(58) Field of Classification Search
USPC .......................................................... 361/270
See application file for complete search history.

(56) References Cited

FOREIGN PATENT DOCUMENTS

| | | | |
|---|---|---|---|
| EP | 3063789 | A1 | 9/2016 |
| EP | 3428955 | A1 | 1/2019 |
| EP | 3556910 | A1 | 10/2019 |
| EP | 3567645 | A1 | 11/2019 |
| EP | 3570307 | A1 | 11/2019 |
| EP | 3656734 | A1 | 5/2020 |
| EP | 3680931 | A1 | 7/2020 |
| EP | 3723148 | A1 | 10/2020 |
| WO | 2015063420 | A1 | 5/2015 |

OTHER PUBLICATIONS

Hsu, M.C. et al.;"The Inductance Enhancement Study of Spiral Inductor Using Ni-AAO Nanocomposite Core"; IEEE Transactions on Nanotechnology, vol. 8, No. 3, May 2009, pp. 281-285.
Raj, P.M. et al.;"Nanomagnetic Thinfilms for Advanced Inductors and EMI Shields in Smart Systems"; Journal of Materials NanoScience, 2014, 1(1), pp. 31-38.
European Search Report issued for EP 19 30 6244, date of completion of search Mar. 31, 2020.

* cited by examiner

NANOMAGNETIC INDUCTOR CORES, INDUCTORS AND DEVICES INCORPORATING SUCH CORES, AND ASSOCIATED MANUFACTURING METHODS

CROSS REFERENCE TO RELATED APPLICATIONS

The present application is a continuation of application Ser. No. 17/684,950, filed Mar. 2, 2022, which is a continuation of International application No. PCT/IB2020/059035, filed Sep. 28, 2020, which claims priority to European Patent Application No. 19306244.5, filed Sep. 30, 2019, the entire contents of each of which are incorporated herein by reference.

FIELD OF THE INVENTION

The present invention relates to the field of magnetic cores for inductors, as well as to methods of fabricating such cores. More particularly, the invention relates to nanomagnetic cores, to inductors and devices incorporating such nanomagnetic cores, and to associated manufacturing methods.

BACKGROUND OF THE INVENTION

For some years there has been interest in fabricating magnetic cores using nanoscale materials, see "Nanomagnetic Thin films for Advanced Inductors and EMI Shields in Smart Systems" by Raj et al. (J. Mat. NanoSci, 2014, 1(1), pp. 31-38. Raj et al. indicate that, compared to micromagnetic structures, nanomagnetic structures cores have a number of advantages.

Raj et al. discuss various types of known nanostructured substrates including particulate nanocomposites, arrays of nanowires, and nanolaminate structures. Particulate nanocomposites are described as having increased permeability (μ', the real part of permeability), and improved frequency stability (smaller variation of μ' as operating frequency increases) which allows the fabrication of an inductor which can operate at higher frequencies. In addition, the dimensions of the nanoscale structures are smaller than magnetic domains and, thus, there are lower energy losses (e.g. low eddy current losses and low hysteretic losses), notably because when a magnetic field is applied there are no domain walls to undergo displacement. Anisotropic, one-dimensional nanostructures based on Ni or Co nanowires are described as having enhanced ferromagnetic resonance (FMR) performance and suppressed FMR-broadening. Two-dimensional nanolaminate structures are described as having higher frequency stability and lower losses. In respect to the fabrication of inductor cores, Raj et al. propose using nanolaminate structures, notably thin-film metal-metal oxide composites.

In order to increase inductance values and thereby enable smaller size inductors to be integrated on chips, Hsu et al. have proposed the use of ferromagnetic material in cores for on-chip inductors and the like (see: "The Inductance Enhancement Study of Spiral Inductor using Ni-AAO Nanocomposite Core" (IEEE Transactions on Nanotechnology, Vol. 8, No. 3, May 2009). Specifically, Hsu et al. propose a nanomagnetic inductor core consisting of homogeneous Ni nanowires embedded in a porous anodized aluminum oxide (AAO) matrix. Hsu et al. propose an inductor that is produced by forming a spiral-shaped track on the surface of this nanomagnetic core, and a small enhancement in inductance was reported for this inductor, as compared to a comparable component using an air core, at operating frequencies ranging up to several GHz.

EP 1 925 696 describes structures in which an AAO template contains nanowires made of repeated alternating segments of Fe and Au. The Fe segments have a diameter of around 200 nm and a thickness of 70 nm, i.e. below the magnetic domain size, and consist of a core made of Fe surrounding by a shell of FeOx.

US 2011/171137 likewise describes structures in which an AAO template contains nanowires made of repeating segments of different materials along the nanowire, for example Ni and Au.

There is a continuing demand for nanomagnetic composites having properties that make them well-suited for use as inductor cores, notably: having high permeability (and high inductance) that is stable up to high operating frequencies, as well as low coercivity. There is also a continuing demand for improved inductors, and for improved devices including integrated inductors.

SUMMARY OF THE INVENTION

The present invention has been made in the light of the above-described demands.

The present inventors have realized that inductor cores based on thin films restrict the dimensions of the magnetic domains only in one direction, i.e. the z-direction (thickness direction), and that inductor cores based on homogeneous nanowires in porous templates restrict the dimensions of the magnetic domains only within the plane of the porous template, i.e. in the x-direction and y-direction. The present invention provides nanomagnetic inductor cores in which the dimensions of the magnetic domains are restricted in three dimensions, in a well-controlled manner. The new core structure is based on segmented nanowires (or nanotubes) in a porous insulating template, and the segmented nanowires comprise—in the z-direction (axial direction)—dielectric material interposed between adjacent segments of magnetic material. The new core structure could be thought of as a pseudo-texturate, with an extremely high degree of ordering and uniformity.

The present invention provides a nanomagnetic inductor core comprising: a porous, electrically-insulating template having high-permeability material in the pores thereof to constitute elongated nanowires, wherein the elongated nanowires are segmented along their axial direction; and a segment of dielectric material interposed between adjacent segments of the high-permeability material along the axial direction of the nanowire, wherein each segment of the high-permeability material has a length, in the axial direction of the nanowire, no greater than a size of a single magnetic domain, and wherein a maximal cross-sectional dimension of the nanowire is no greater than the size of the single magnetic domain.

In the case where high-permeability material is provided in nanowires in elongated pores of an insulating template, and the nanowires are segmented in the axial direction of the pores, with dielectric material interposed between adjacent segments of high-permeability material, the size of the magnetic domains can be restricted in all three spatial dimensions. In this manner, each segment of high-permeability material can be dimensioned so that it constitutes a single magnetic domain. This configuration enables high apparent resistivity to be obtained as a consequence of the fact that intermediate isolation layers are present in 3D directions. Furthermore, the imaginary portion of permeability (μ") is lowered and this may cause ferromagnetic resonance to occur at a higher frequency. Moreover, the segments of high-permeability material amount to grains that include no more than one magnetic domain. Thus, losses due to domain wall displacement are eliminated and eddy current losses are low. So, there are low hysteretic losses, and the nanocomposite inductor core provides excellent permeability values while still maintaining low coercivity.

Incidentally, the reference here to "high-permeability material" refers to materials for which the permeability μr is much greater than 1.0. Such materials are often called ferromagnetic materials.

The segmentation of the nanowires in the axial direction may be implemented in various ways. For instance, in some embodiments of the invention different high-permeability materials are present in the same nanowire. In other embodiments of the invention, all the segments of high-permeability material in a given nanowire are made of the same material.

The segments of high-permeability material may be made of various materials, for example: Zn, Fe, Ni, Co, Mn, Cr, mixtures and alloys of different elements, ZrO, CoZr, permalloy, etc.

The porous, electrically-insulating template may be made of various materials, for example: porous anodic aluminum oxide (AAO) or another porous dielectric material.

An advantage of materials such as AAO is that they enable the fabrication of nanoporous tubular self-organized structures which are easily processable and inexpensive.

The present invention further provides inductors incorporating nanomagnetic inductor cores of the above-described types.

Thus, the invention further provides an inductor comprising a first conductor and a second conductor, wherein the first and second conductors are electrically interconnected to encircle a nanomagnetic inductor core of one of the above-described types.

In the latter inductor, the nanomagnetic inductor core may be sandwiched between the first and second conductors, and the first and second conductors may be electrically interconnected by via-hole conductors traversing the nanomagnetic inductor core.

The invention yet further provides an inductor comprising a three-dimensional coil wound around a nanomagnetic inductor core of one of the above-described types. By encircling the core with the inductor wire in 3D a size reduction may be obtained (compared to the case where the inductor wire is formed as a two-dimensional coil on the core surface).

The invention still further provides an inductor comprising a nanomagnetic inductor core of one of the above-described types, and a two-dimensional coil (e.g. shaped like a race-track) formed on one surface of the nanomagnetic inductor coil. In a variant, the two-dimensional core is sandwiched between two of the nanomagnetic inductor cores.

In the case of an inductor that is formed by providing a two-dimensional coil structure on a surface of the nanomagnetic core, the coil structure may provide a degree of shielding against electromagnetic interference (EMI). This phenomenon can be useful, for example, in the case where the inductor is integrated in a chip that also includes other electronic components. Sandwiching the 2D coil between two nanomagnetic cores helps with EMI issues underneath the 2D coil and also above the structure.

The invention yet further provides an LC interposer in which an inductor of one of the types described above is integrated in a common substrate with a capacitor, and the capacitor comprises a nanoscale capacitive structure formed in pores of the electrically-insulating porous template of the nanocomposite inductor core.

The present invention still further provides a method of fabricating a nanomagnetic core, the method comprising: forming elongated nanowires comprising high-permeability material in pores of an electrically-insulating porous template, the nanowires being segmented along their axial direction; and interposing a segment of dielectric material between adjacent segments of the high-permeability material along the axial direction of the nanowire, wherein each segment of the high-permeability material has a length, in the axial direction of the nanowire, no greater than a size of a single magnetic domain, wherein a maximal cross-sectional dimension of the nanowire (i.e. in x or y, perpendicular to the axial direction) is no greater than the size of a single magnetic domain.

The above-recited method provides comparable advantages to those mentioned above in relation to the nanomagnetic inductor core. Moreover, this method of fabricating the nanomagnetic inductor core enables a high degree of control to be exercised on the dimensions of the nanowire segments.

BRIEF DESCRIPTION OF THE DRAWINGS

Further features and advantages of the present invention will become apparent from the following description of certain embodiments thereof, given by way of illustration only, not limitation, with reference to the accompanying drawings in which.

DETAILED DESCRIPTION OF THE PREFERRED EMBODIMENTS

The present invention relates to the fabrication of an inductance using a magnetic core built out of a functionalized porous matrix, wherein the dimensions of the deposited magnetic material are controlled in three dimensions. This new way of controlling the shape of the magnetic material produces confinement of the magnetic field and results in a nanomagnetic inductor core having excellent performance, including low losses. The distances between adjacent domain walls can be made small compared to magnetic domains (e.g. typ. <100 nm), in all three spatial dimensions. Thus, the magnetic losses are reduced (μ"). Very high efficiency is expected. Eddy currents are reduced because the nanowire's textured structure does not allow current loops in the X/Y plane, and also not in the Z direction given that the segmentation along the Z direction comprises dielectric material. Furthermore, the real part of permeability (μ') is stable over higher frequency range.

A nanomagnetic inductor core according to an embodiment of the invention will now be described with reference to FIGS. 1 to 3.

Figure 1:
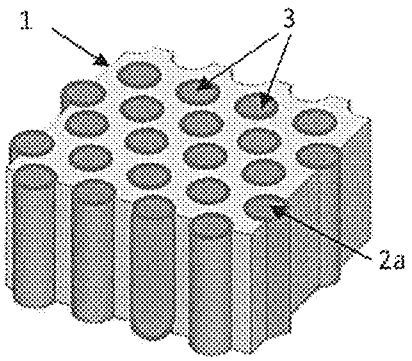
FIG. 1 illustrates, schematically, a nanomagnetic inductor core according to an embodiment of the present invention

As can be seen from the partial, enlarged view shown in FIG. 1, a nanomagnetic inductor core structure 1 according to the present embodiment includes a porous matrix 2 with nanowires/nanotubes 3 in the pores 2*a*. The nanowires/nanotubes 3 are segmented along their axial direction as shall be discussed below.

The porous matrix 2 is formed of an electrically-insulating material. The electrically-insulating material may be AAO, another porous anodic oxide, or another porous dielectric. If desired, a nanoporous polymer membrane may be used. An advantage of AAO is that various production techniques have been developed which process aluminum to create a self-organized AAO structure comprising large numbers of nanoscale elongated pores extending substantially parallel to each other in a regular array, with a high degree of controllability of the properties of the porous material (e.g. in terms of pore diameter, inter-pore distance, etc.). One example production method is the "one-step" anodizing process described in the above-mentioned Hsu et al. document. Another production method is the so-called "two-step" process in which a first oxide film (formed in a first anodizing step) is removed but pre-patterns the substrate so that a second oxide film (formed in a second anodizing step) has a much more regular structure. Such production techniques are known and so shall not be described in detail here. It will just be noted that the production techniques may include ancillary processes additional to anodization, such as, for example, etching to increase pore diameter.

Figure 2:
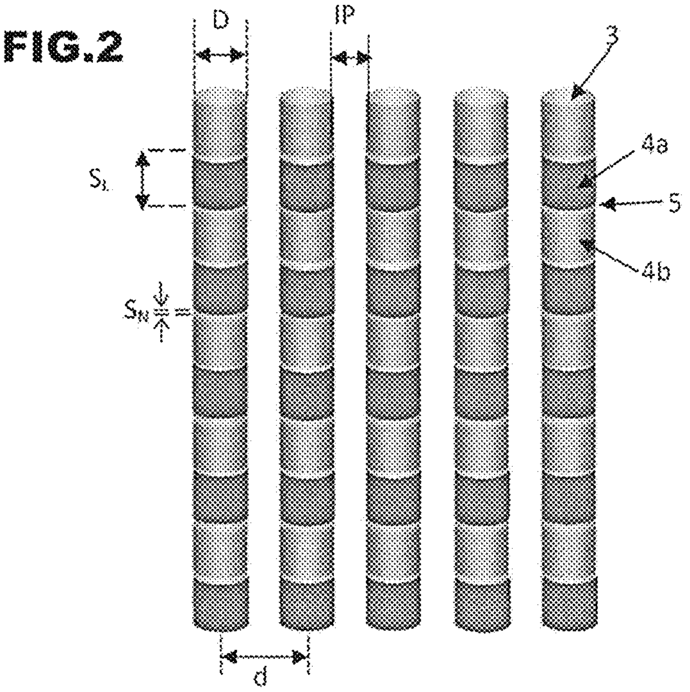
FIG. 2 illustrates the segmented nature of the nanowires/nanotubes in the core structure of FIG. 1.
Figure 3:
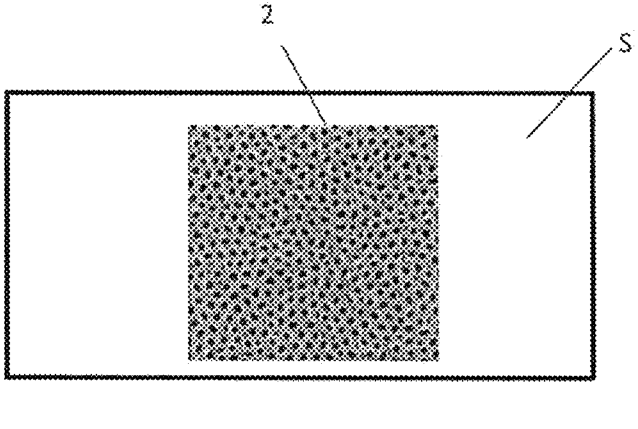
FIG. 3 illustrates schematically a nanomagnetic inductor core, forming part of, and integrated in, a substrate, according to an embodiment of the invention.

FIG. 2 is a diagram representing an enlarged view of a group of the nanowires 3 formed in the pores 2*a* of the porous template 2, demonstrating the segmented nature of the nanowires 3. As illustrated in FIG. 2, each nanowire is segmented along its axis. Each pore/nanowire has a diameter D and center lines of adjacent pores/nanowires are spaced from one another by an inter-pore distance d. In the illustrated example, nanowire segments 4*a*, 4*b* made of high-permeability material have a length $S_L$ in the axial direction of the nanowire and alternate with nanowire segments 5 made of dielectric material having a length $S_N$ in the axial direction of the nanowire.

The diameter D of the pores 2*a* limits the dimensions, in the x and y directions, of each segment 4*a*/4*b* of high-permeability material, and diameter D is less than 1 μm so that the relevant segment dimensions do not exceed the size of a magnetic domain. Typically, the diameter D of the pores 2*a* is set in the range of 15 nm-250 nm. Particularly good results are obtained in the case where the diameter D of the pores is no greater than 100 nm. References here to pore diameter refer to the average diameter of the pores.

Typically, the inter-pore distance d is set in the range of 30 nm-500 nm. In the case of a porous template 2 consisting of a porous anodic oxide, the dimensions D and d may be regulated by control of the voltage applied, and of the acid used, during the anodization process. Dimension D can also be further tailored by introducing a step of etching to enlarge pores.

In the case of using a porous template which has pores that are not circular, the dimensions, in the x and y directions, of each segment 4*a*/4*b* of high-permeability material, may be suitably limited by ensuring that the maximal dimension of the pore in cross-section is no greater than the size of one magnetic domain.

The length $S_L$ of the nanowire segments 4*a*, 4*b* made of high-permeability material in the axial direction of the nanowire is typically less than 100 nm and so the segment dimension in the z-direction does not exceed the size of a magnetic domain. Typically, the length $S_L$ of the nanowire segments 4*a*, 4*b* made of high-permeability material is set comparable to the pore diameter D.

Various different types of high-permeability material may be used in the nanowires, including but not limited to: Zn, Fe, Ni, Co, Mn, Cr, mixtures and alloys of different elements, permalloy, ZrO, CoZr, etc. In a given nanowire, all of the segments made of high-permeability material may be made of the same material (homogeneous nanowire), or the nanowire may include segments made of different high-permeability materials.

Various different types of dielectric material may be used in the nanowires. However, it is convenient to form the dielectric material by oxidation of the material in an earlier-deposited segment of high-permeability material. Thus, in the latter case the dielectric segments will consist of one or more oxides of the high-permeability material(s) used in the nanowires.

In view of maximizing the permeability (i.e. to maximize the volume fraction of magnetic material compared to dielectric material), it is preferred to set the length $S_N$ of the nanowire segments 5 made of dielectric material approximately the same as or below the width IP of the dielectric matrix material interposed between adjacent pores.

The length $S_N$ of the nanowire segments 5 made of dielectric material in the axial direction of the nanowire is preferably less than 100 nm and more preferably in the order of 10 nm. In principle, the thickness $S_N$ of the dielectric layer can be even lower, e.g. a few nanometers, provided that it is sufficient to ensure continuity and isolation, i.e. a continuous insulation layer preventing conduction in the axial direction of the nanowire.

Various techniques may be used to deposit material in the pores 2*a* of the porous template 2 to form the segments 4*a*, 4*b* of the nanowires/nanotubes 3. Processes for depositing material in pores of a porous template are well-known and will not be described in detail here. However, as a non-limiting example, we will mention electrochemical deposition. For example, a conductive seed consisting of Ni may be deposited into the pores 2*a* by an electrolytic deposition process and then segmented wires may be co-grown by ECD in the porous template using one or more Watts-type baths, until the pores are completely filled. Complete filling of the pores ensures that the highest possible value of permeability may be obtained.

In various embodiments of the invention, the porous template 2 illustrated in FIG. 1 is fabricated, not as a standalone block of porous material, but rather as a region within a substrate, for example so that the nanomagnetic inductor core may be incorporated into an integrated inductor. FIG. 3 is a schematic representation of a top view of a substrate S in which a porous template region 2 has been formed. As one example, the substrate S may consist of a thick aluminum layer (optionally formed on a supporting substrate) and the porous template 2 may be formed in a selected region of the aluminum layer by employing a mask to define the selected region and then anodizing the region left accessible by the mask. The segmented nanowires are then formed in the porous template region 2 within the substrate S.

Nanomagnetic inductor cores according to the invention may be used in various configurations of inductor.

Figure 4:
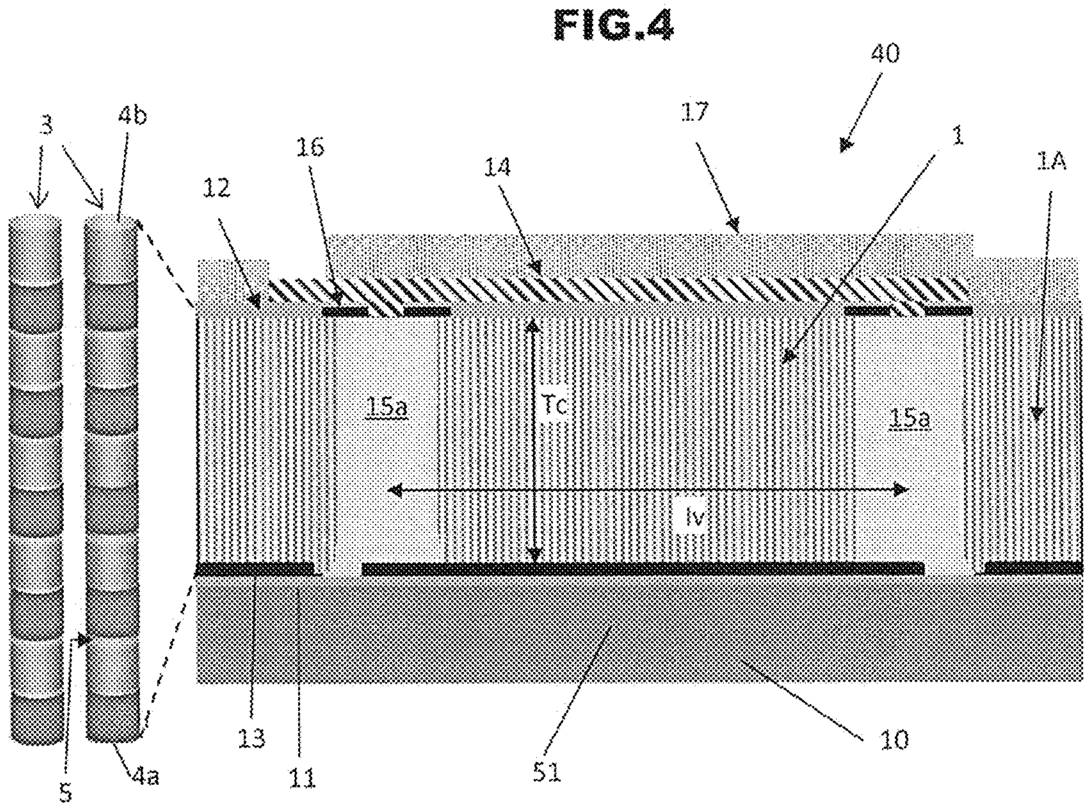
FIG. 4 illustrates a first example inductor exploiting a nanomagnetic inductor core embodying the invention.

FIG. 4 illustrates a first inductor structure 40 in which a nanomagnetic inductor core 1 according to an embodiment of the invention, of thickness Tc, is provided on a base substrate 10. In this example the nanomagnetic inductor core 1 is 13 μm thick and consists of an AAO template containing nanowires made of segments of Fe and Ni alternating along the axial direction, with dielectric segments made alternately of iron oxide and of nickel oxide interposed between adjacent Fe and Ni segments. The growth of such structure can be obtained by AC current driven electro-deposition process.

One or more lateral isolation regions 1A are provided to surround the nanomagnetic inductor core 1. In this example, the nanomagnetic core is surrounded by a lateral isolation region 1A which is also made of AAO. Nanowires may be provided in at least some of the pores of the AAO in the lateral isolation region 1A, see below. In such a case the lateral isolation region 1A can be produced in a common anodization step with the AAO template that will house the nanowires, reducing the number of steps required for fabrication of the structure. However, in other embodiments the lateral isolation region(s) may be made in a separate step after the nanowires have been grown (e.g. by implementing another hard mask with the same hard masking process as that described below).

In this example the base substrate 10 is made of high-resistivity silicon, but other materials may be used. In this example the high-resistivity silicon substrate 10 is 10-50 microns thick. A first insulating layer 11 is formed on the substrate 10 so as to provide DC isolation to the substrate (i.e. symmetrical to layer 12 discussed below) and a first conductor (implemented in this example as an electrically-conductive layer 13 formed on the first insulating layer 11) is interposed between the substrate and one side of the nanomagnetic inductor core 1. In this example the first insulating layer 11 is made of an oxide (e.g. $SiO_2$), but other insulating materials may be used. In this example the conductive layer 13 is made of aluminum, but other conductive materials may be used.

In the case of a nanomagnetic core formed by an "underpath last" process of the type described below in relation to FIGS. 13A to 13H and FIGS. 13J to 13M, layer 11 may be a hard mask material for etching of Si and need not be an insulator. Indeed, in such a case it may be advantageous for layer 11 to be conductive so that standard dc ECD processes may be used during formation of the nanowires.

Returning to description of the structure according to the example illustrated in FIG. 4, an anodic-etch barrier layer (not shown) is provided between the conductive layer 13 and the nanomagnetic inductor core. The anodic-etch barrier layer may be made of any suitable material including, but not limited to, tungsten. In the case of using a tungsten anodic-etch barrier layer typically this is 300 nm thick. The conductive layer 13 and the etch barrier are etched away outside the under-path represented by the metallic strips 51 in FIG. 4.

An insulator layer 12 is formed on the other side of the nanomagnetic inductor core 1 (i.e. on the top surface of the core 1 in the orientation represented in FIG. 4). In this example the insulator material 12 is made of silicon dioxide, i.e. the same material as the hard mask (see below), but other materials may be used. A second conductor 14 is formed on the insulator layer 12. In this example, the second conductor 14 is made of Cu or Ni, but other materials may be used. The second conductor may be deposited by any convenient process, e.g. ECD.

Via-hole conductors 15*a* traverse the nanomagnetic inductor core 1 and are connected to via-hole conductors 15*b* which traverse the insulator layer 12. The via-hole conductors 15*a*, 15*b* electrically connect the underpath (strip 51 of the first conductor) to the second conductor 14, encircling a region R of the nanomagnetic inductor core 1. In the example illustrated in FIG. 3 the distance Iv between the via-hole conductors 15*a* is 300 μm. In the case where the via-hole conductors 15*a*, 15*b* are made of the same material they may be deposited in a common process, reducing the number of steps in the overall fabrication process. In the example illustrated in FIG. 3 the via-hole electrodes 15*a*, 15*b* are made of Cu or Ni, but other materials may be used. Various techniques may be used for depositing the material forming the second conductor 14 and the via-hole conductors 15*a*, 15*b*, including but not limited to ECD. In the case where Cu is used to form the second conductor 14 and the via-hole conductors 15*a*, 15*b* shaping of the inductance may be facilitated.

As an example, the thickness of the first conductor 13 may be set in the range 1 μm-3 μm, the thickness of the insulating layer 12 may be set in the range from hundreds of nanometers up to a few microns and the thickness of the second conductor 14 may be set relatively high in order to reduce the equivalent series resistance (ESR). As an example, a typical thickness value for layer 14 when that layer is formed of Cu and it is desired to reduce ESR may be 10 μm or greater.

Figure 5:
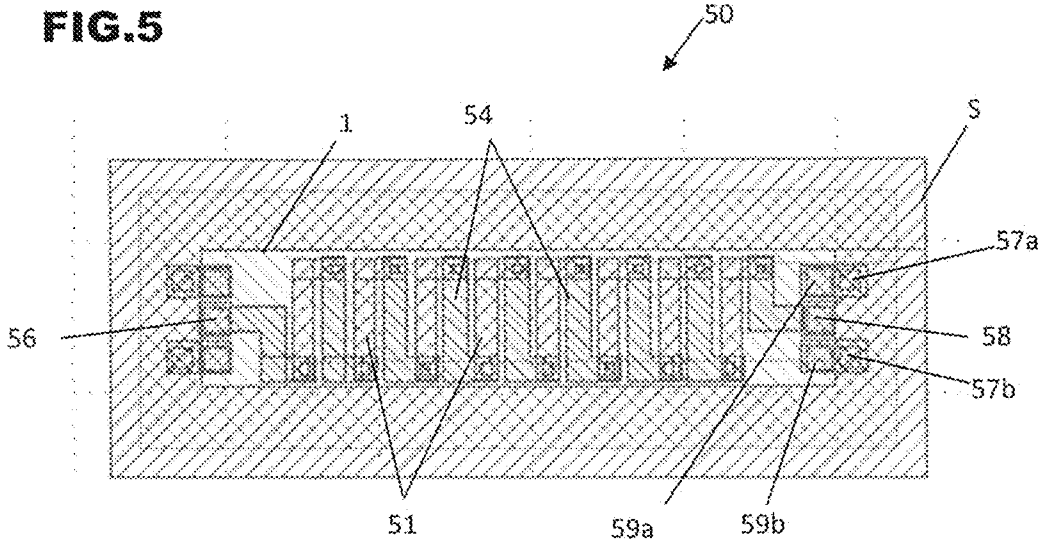
FIG. 5 illustrates a second example inductor exploiting a nanomagnetic inductor core embodying the invention.

FIG. 5 illustrates, in plan view, a second inductor structure 50 in which a nanomagnetic inductor core 1 according to an embodiment of the invention is provided integrated in a substrate S. The second inductor structure 50 illustrated in FIG. 5 is a three-dimensional inductor. In this example a spiral inductor coil is formed by conductive tracks 54 formed on the top surface of the nanomagnetic inductor core 1 and conductive tracks 51 formed on the bottom surface of the nanomagnetic inductor core 1, interconnected by via-hole conductors (not shown) traversing the nanomagnetic inductor core 1. The inductor terminals 56, 58 are provided at the top surface of the substrate S. In this example, ground terminals 57*a*, 57*b* are also provided at the top surface of the substrate, to enable connection to a ground potential, and additional pads 59*a*, 59*b* are provided to enable radio-frequency measurement probes to be connected to the component.

Figure 6:
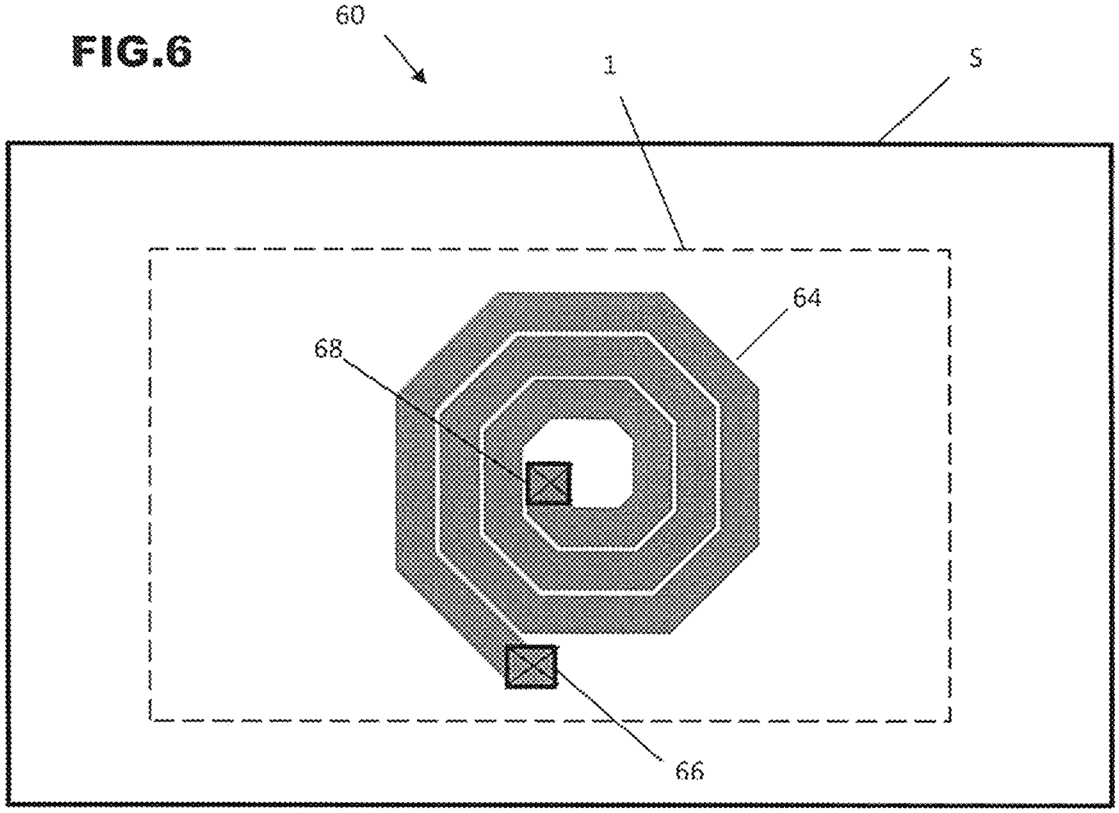
FIG. 6 illustrates a third example inductor exploiting a nanomagnetic inductor core embodying the invention.

FIG. 6 illustrates schematically, in top plan view, a third inductor structure 60 in which a nanomagnetic inductor core 1 according to an embodiment of the invention is provided integrated in a substrate S. The second inductor structure 60 illustrated in FIG. 6 has a two-dimensional inductor coil 64 formed on the top surface of the nanomagnetic inductor core 1. The inductor terminals 66, 68 are provided at the top surface of the substrate S.

Figure 7:
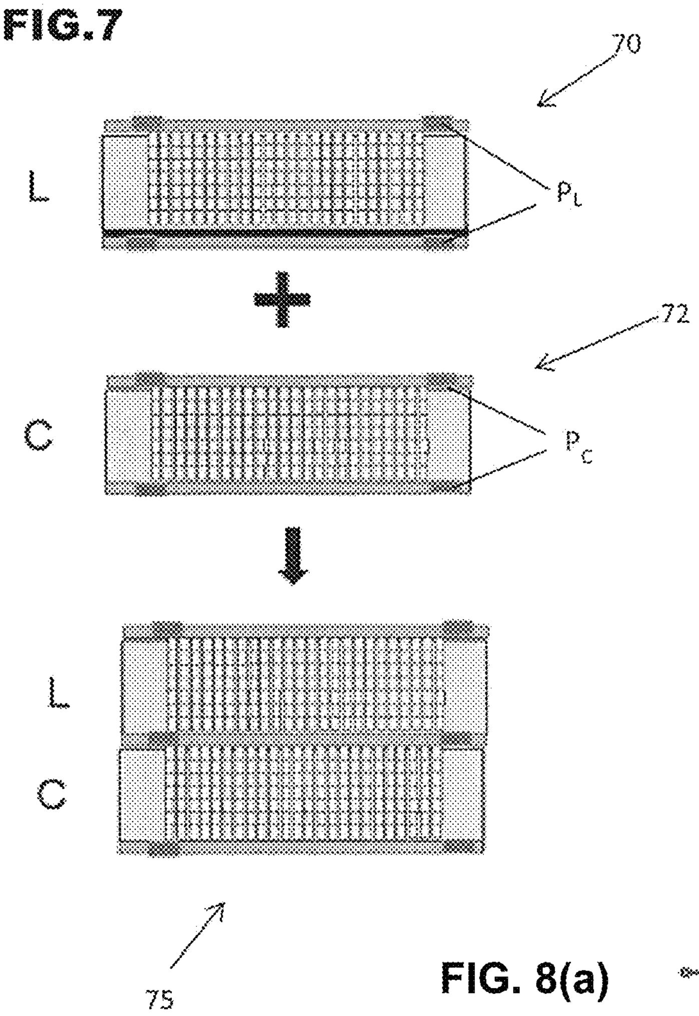
FIG. 7 illustrates an LC interposer according to an example embodiment of the invention.

FIG. 7 illustrates an LC interposer 75 according to an example embodiment incorporating a nanomagnetic core according to the invention.

In the example illustrated in FIG. 7, the LC interposer 75 comprises stacked components. The stacked components include an inductor component 70 having connection pads PL and a capacitor component 72 having connection pads PC. The inductor component 70 incorporates an inductor core according to any of the embodiments of the invention. In the present example the capacitor component 72 comprises one or more three-dimensional capacitors. For example, the capacitor component 72 may comprise a capacitive stack formed over a group of pores in a porous template (e.g. an AAO template). Such a capacitive stack may be a simple or repeated stack of electrode and insulator layers (i.e. EIE, EIEIE, and so on, where E stands for a conductive (electrode) layer and I stands for an insulating layer). The capacitor component 72 may be a component as described in any of the applicants' co-pending European patent applications 14 825 391.7, 17 305 897.5, 18 305 492.3, 18 305 582.1, 18 305 624.1, 18 306 565.5, 19 305 021.8, and 19 305 457.4.

Various advantages arise in a case where the L component 70 and the C component 72 both include porous templates made of the same material. For example, in this case both components have the same thermal coefficient of expansion and thus thermal stresses in the structure are reduced. Furthermore, co-integration of the components is facilitated because the same process steps can be used for both components during fabrication.

Figure 8A:
FIGS. 8(*a*) to 8(*c*) represent several equivalent circuits that can be embodied using LC interposers incorporating inductor cores according to embodiments of the invention.
Figure 8B:
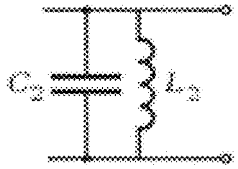
Figure 8C:
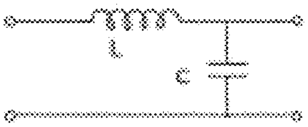

Depending on the manner in which the connection pads $P_L$ and Pc are interconnected, the stacked components 70, 72 can implement the different equivalent circuits illustrated in FIGS. 8(*a*), 8(*b*), and 8(*c*).

Figure 9:
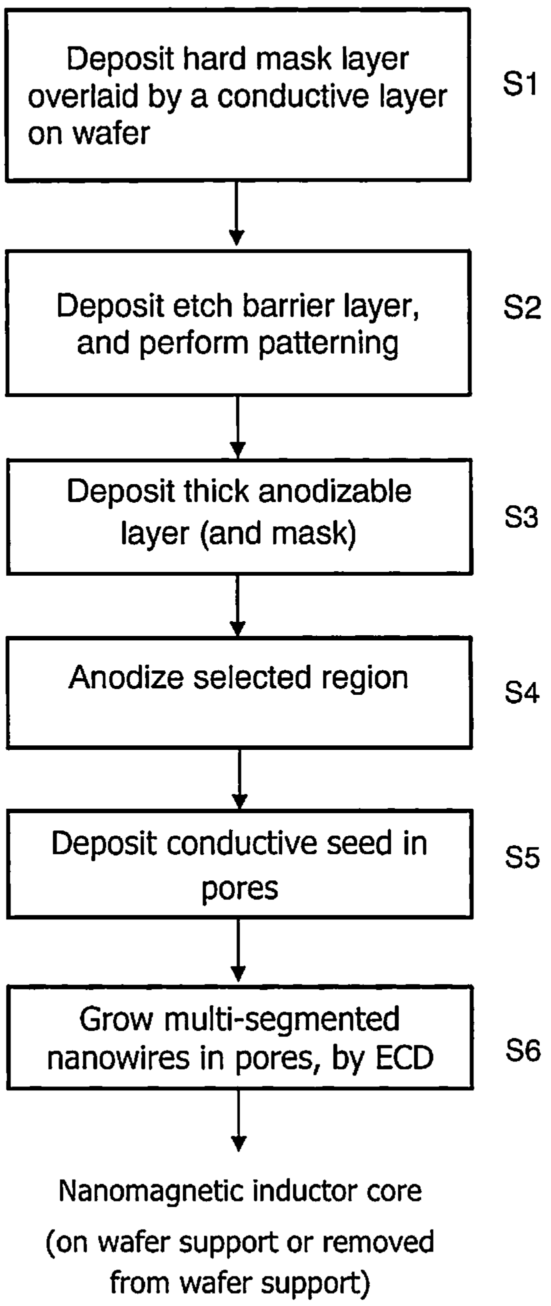
FIG. 9 is a flow diagram illustrating the main stages in a method, according to an example embodiment of the present invention, for fabricating a nanomagnetic core such as that of FIGS. 1 and 2.

FIG. 9 is a flow diagram setting out a sequence of processes in an example method of fabricating a nanomagnetic inductor core according to the invention. In the method illustrated in FIG. 9, the nanomagnetic inductor core is formed integrated in a substrate and supported on a wafer which bears a conductive underpath. This facilitates subsequent incorporation of the core into an inductor. Of course, other fabrication methods are possible and need not form the core on a wafer bearing an underpath conductor.

In the method illustrated in FIG. 9 a thick conductive layer made, for example, of aluminum is deposited on a wafer (S1). The wafer may, for example, be made of highly resistive silicon, or other materials, including for instance a substrate overlaid by a hard mask layer resistant to silicon etching process like for example SiO2 if the etching process is made with SF6. This thick conductive layer will serve as a bottom electrode of the inductor. Next a conductive etch-barrier layer (made, for example, of Pt, Au, Ti, W, Mo, etc.) is deposited (S2) onto the thick metallic layer and both of these two layers are patterned by a photolithographic process. The patterned layers are suitable to constitute an underpath, i.e. a conductive path underneath the nanomagnetic inductor core that can be exploited when the core is incorporated into an inductor.

In this example method, a thick anodizable layer is deposited on top of the barrier layer (S3). As an example, the anodizable layer may be made of aluminum. Typically, an AI anodizable layer is deposited by a physical vapor deposition process and the layer is formed to have thickness of the order of 4-8 μm (usually no thicker than approximately 10 μm). A selected region of the anodizable layer is defined using a hard mask (not shown) made of a resistant material such as $SiO_2$ which may, for example, be of the order of 1 μm thick, and then the selected region is anodized (S4) to obtain a nanoscale oriented tubular structure—made, for example, of AAO.

It will be understood that processes S1-S4 form a porous template on a wafer bearing the patterned layers which will serve as an underpath. Although specific processes have been described (e.g. anodization, photolithography) it will be understood that other processes may be adopted to form a porous template on a wafer+underpath, as desired. Moreover, in architectures that do not employ an underpath the porous template may be formed directly on a support substrate (e.g. a wafer).

Typically, in the present example method, the wafer is of the order of 10 μm thick, the thick conductive layer deposited on the wafer, under the anodic-etch barrier layer, is from 100 nm-1 μm thick and the anodic etch-barrier layer is of the order of 300 nm thick.

According to the example illustrated in FIG. 9, in order to form the desired nanowire structure within the pores of the porous template, a conductive seed consisting of Ni is deposited into the pores by an electrolytic deposition process (S5). Multi-segmented wires are then co-grown by ECD in the tubular structure using a Watts-type bath until the pores are filled (S6). More specifically, in this example the following sub-steps are repeated to create multi-segmented nanowires:

a) a segment of a first high-permeability material (material 1) is deposited in the pores;
b) then an oxidation process is performed to create a layer of oxide at the exposed top surface of the segment made of material 1, this oxide being an oxide of material 1;
c) a segment of a second high-permeability material (material 2) is deposited in the pores
d) then an oxidation process is performed to create a layer of oxide at the exposed top surface of the segment made of material 2, this oxide being an oxide of material 2.

If homogenous nanowires are desired, in sub-steps a) and c) the same high-permeability material may be the deposited (i.e. material 1=material 2).

If it is desired to form nanowires comprising more than two different high-permeability materials, the sequence of deposition and oxidation processes may be adjusted to produce the desired pattern of layers.

In the above-described example, the fabrication process is simplified by virtue of the fact that the dielectric segments are formed by oxidation of earlier-deposited high-permeability material. However, it is not mandatory to form the dielectric segments by oxidizing the previously-deposited high-permeability material: if desired, dielectric segments may be formed by depositing a selected dielectric material in the pores.

It will be understood that processes S5-S6 form segmented nanowires in the pores of the porous template. Although specific processes have been described, it will be understood that other processes may be adopted to form segmented nanowires in the porous template, as desired and as appropriate to the materials being deposited as well as the material forming the porous template.

Figure 10:
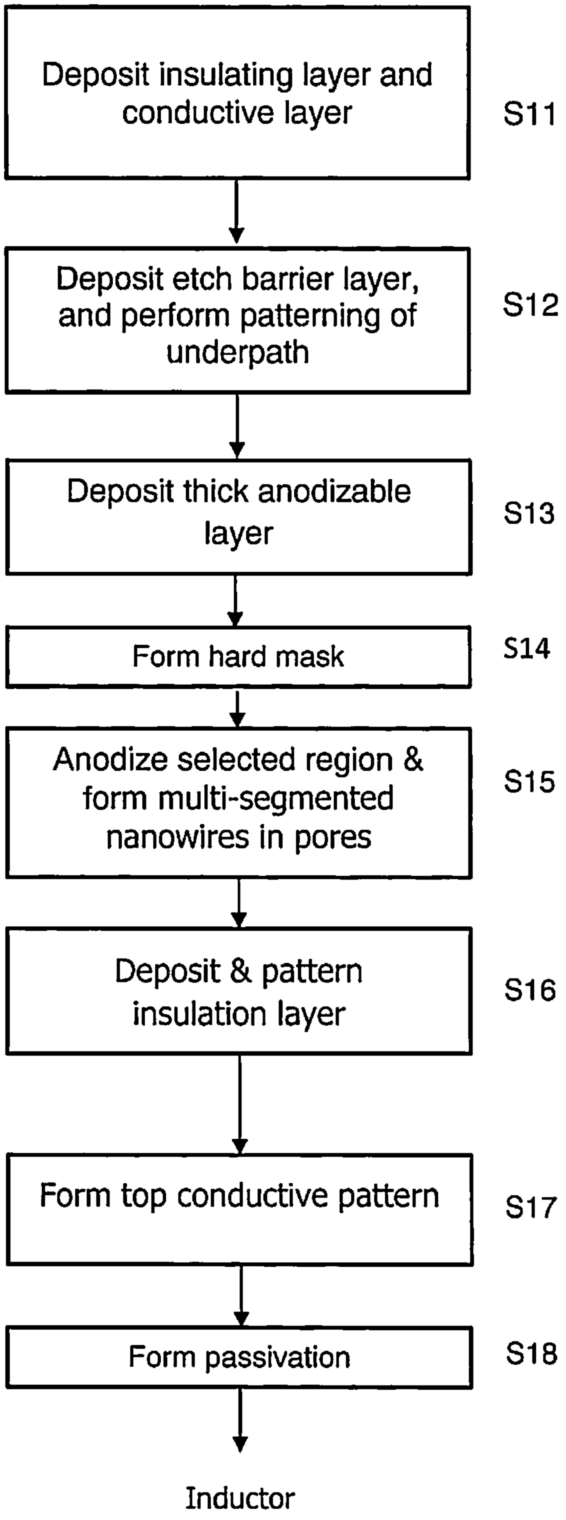
FIG. 10 is a flow diagram illustrating the main stages in a first method, according to an embodiment of the present invention, for fabricating an inductor such as that of FIG. 4.

FIGS. 10 and 11A to 11H illustrate a first fabrication method, which is an example method of fabricating a nanomagnetic inductor according to the embodiment illustrated in FIG. 4, in which the patterning of the underpath takes place towards the start of the process. FIG. 10 is a flow diagram setting out the sequence of processes in the fabrication method and FIGS. 11A to 11H represents the structure at different stages in the method. Steps S11 to S16 of the method illustrated by FIGS. 10 and 11A to 11H may be performed using techniques described above in relation to steps S1 to S6 of the method according to FIG. 9.

Figure 11A:
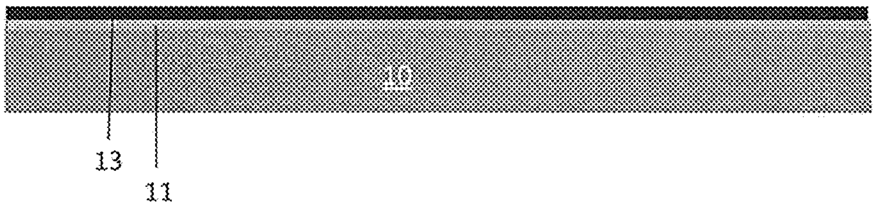
FIGS. 11A to 11H illustrate the structure at various stages in the method of FIG. 10.
Figure 11B:
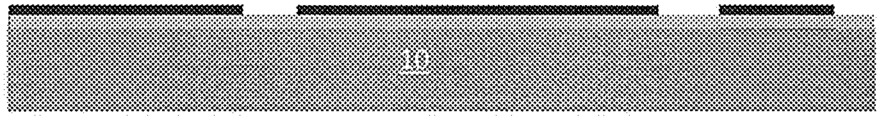

Thus, in the method illustrated in FIGS. 10 and 11A, a thick conductive layer 13 is deposited on a wafer (S11). In this case the wafer consists of a substrate 10 bearing a layer of insulator 11. The thick conductive layer 13 will serve as a bottom electrode of the inductor. Next, a conductive etch-barrier layer (not shown) is deposited onto the thick metallic layer 13. Next, both of these two layers are patterned by a photolithographic process (S12) to produce the structure illustrated schematically in FIG. 11B. The portions of conductive layer 13 remaining, together with the overlying portions of conductive etch-barrier material, will constitute an underpath.

Figure 11C:
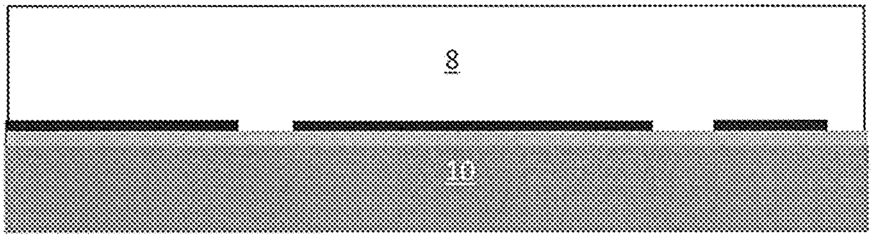
Figure 11D:
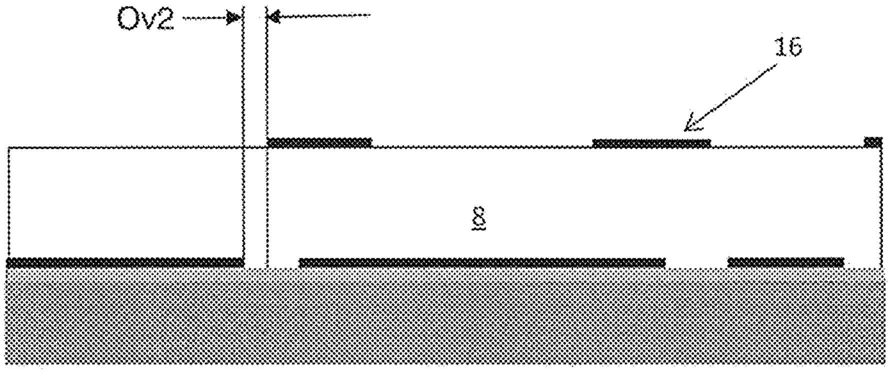

A thick anodizable layer 8 is deposited on top of the etch-barrier layer (S13) to form the structure illustrated schematically in FIG. 11C. A hard mask 16 is formed (S14) on the surface of the anodizable layer 8 to define the region(s) to be anodized, as illustrated by FIG. 11D. The selected region(s) of the anodizable layer are anodized to obtain a nanoscale oriented tubular structure as illustrated in FIG. 11E.

Figure 11E:
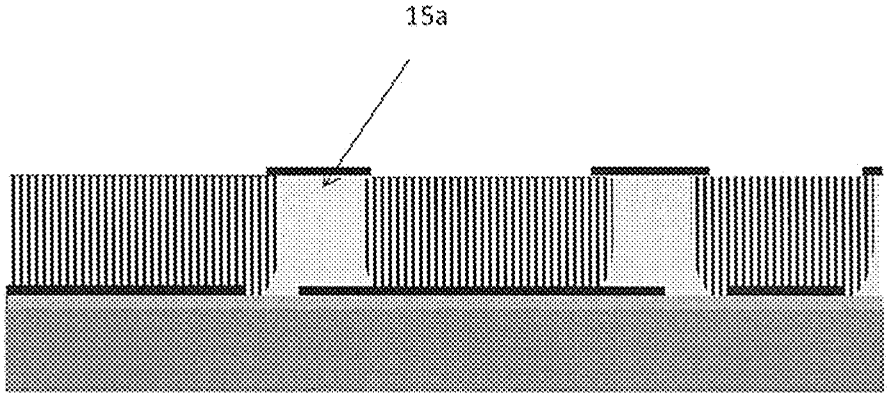
Figure 11F:
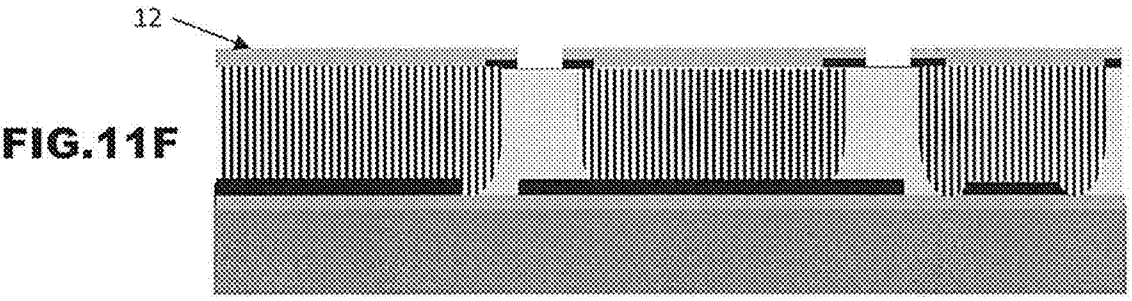
Figure 11G:
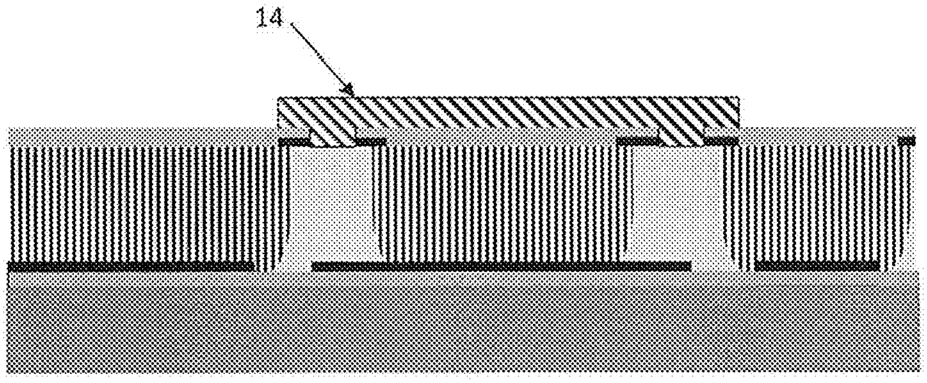
Figure 11H:
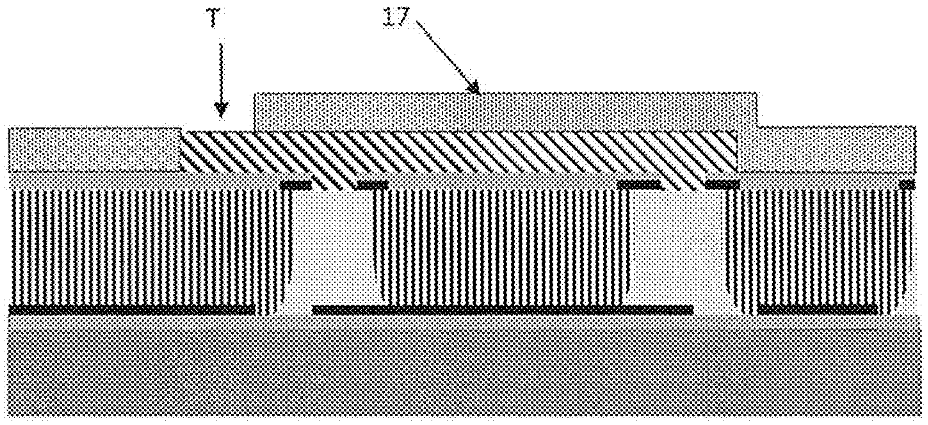

Multi-segmented wires are then co-grown bottom-up by ECD in the tubular structure using one or more Watts-type baths until the pores are filled (S15) as illustrated in FIG. 11E. Regions of the anodizable layer 8 that lie under the hard mask 16 do not undergo anodization and so remain conductive and can serve as vias 15*a* in the finished structure. The shape of these non-anodized regions tends to flare outwards at the bottom end (in proximity to the substrate 10). Accordingly, to ensure that a given via 15*a* contacts a desired wiring trace 51 without making contact to an adjacent portion of the conductive layer 13, there is an offset Ov2, in the horizontal direction, between the outer edge of the hard mask 16 and the right-hand edge of the portion of the conductive layer 13 to the left of the wiring trace 15 in FIG. 4.

According to the example illustrated in FIGS. 10 and 11, in order to complete an inductor structure, an additional conductive layer is required at the top of the structure. First an insulating layer 12 is deposited over the nanowire regions and the hard mask, and patterned as illustrated in FIG. 11F to leave openings exposing the vias 15*a* (S16). Then a conductive material 14 is deposited onto the structure and patterned in wires so as to form a closed electric path with the underpath (S17), as illustrated in FIG. 11G. A passivation layer 17 may be formed over the structure (S18), leaving exposed a location T where an inductor terminal may be formed, as illustrated in FIG. 11H.

If desired, the above-described method may be varied so that steps S13 to S15 are repeated, over an insulating layer instead of a conductive layer (step S), so as to have nanowires consisting of a lower magnetic segment and an upper magnetic segment separated by an insulating layer.

Figure 12:
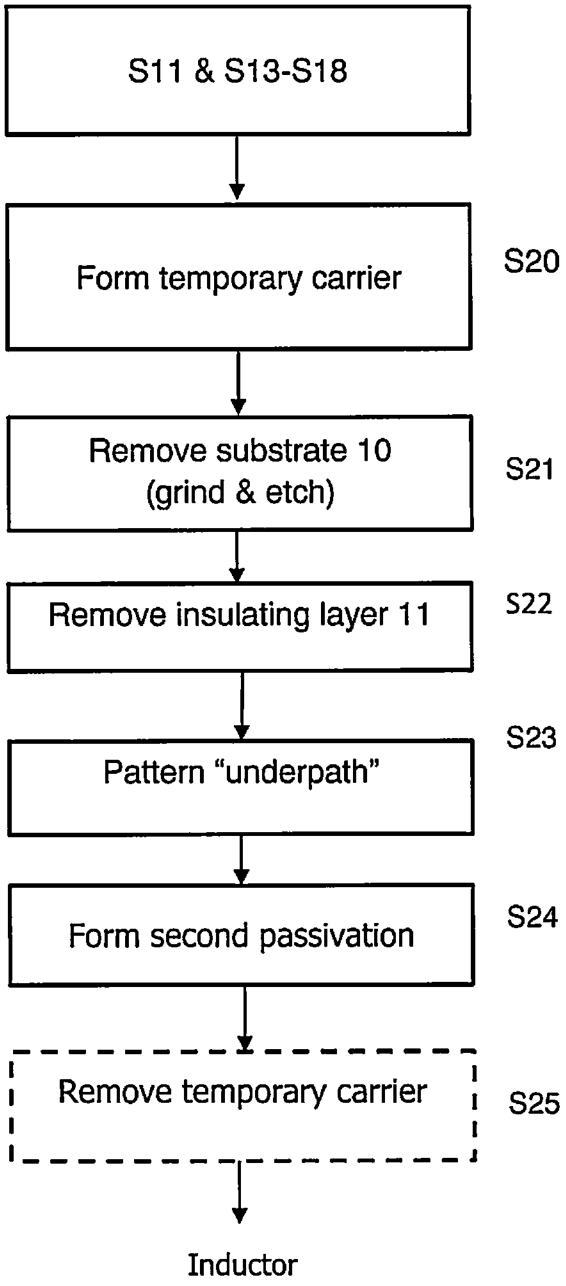
FIG. 12 is a flow diagram illustrating the main stages in a second method, according to an embodiment of the present invention, for fabricating an inductor.

FIG. 12, FIGS. 13A to 13H and FIGS. 13J to 13M illustrate a second fabrication method, which is an example method of fabricating a nanomagnetic inductor, in which the patterning of the underpath takes place towards the end of the process. FIG. 12 is a flow diagram setting out the sequence of processes in the fabrication method and FIGS. 13A to 13M represent the structure at different stages in the method.

In the method illustrated by FIG. 12, the initial steps of the process are constituted by steps S11 and S13-S18 of the method represented in FIG. 10. In this case the step S12 is omitted, i.e. the patterning of the underpath is not performed prior to the deposition of the anodizable layer 8. FIGS. 13A to 13G illustrate the structure produced in these initial steps of the process.

Figure 13A:
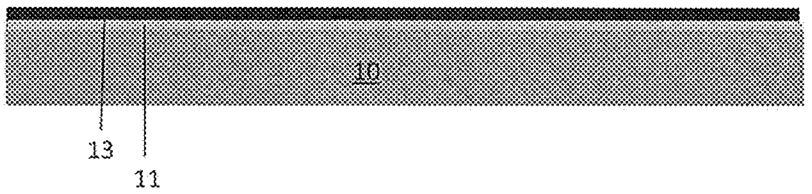
FIGS. 13A to 13H and FIGS. 13J to 13M illustrate the structure at various stages in the method of FIG. 12.
Figure 13B:
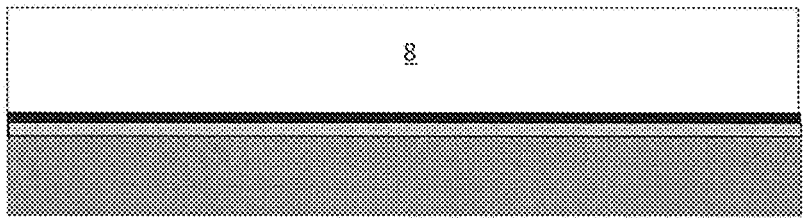
Figure 13C:
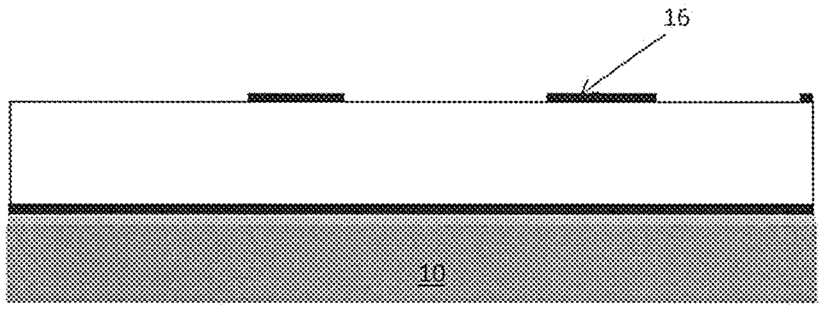
Figure 13D:
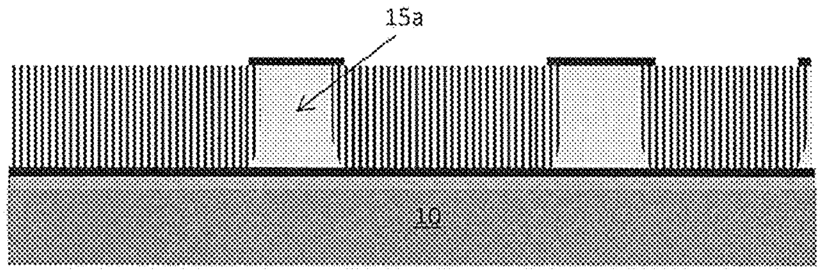
Figure 13E:
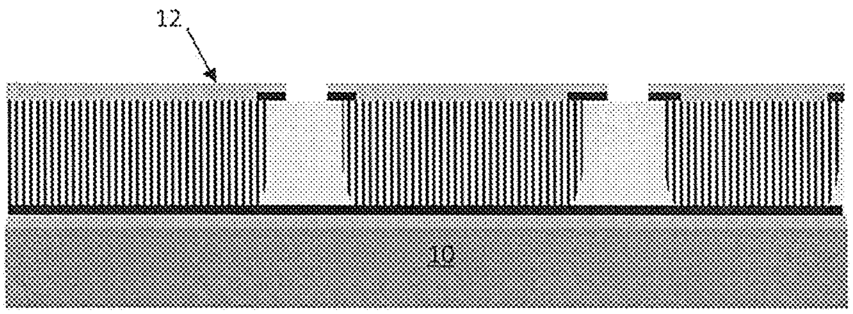
Figure 13F:
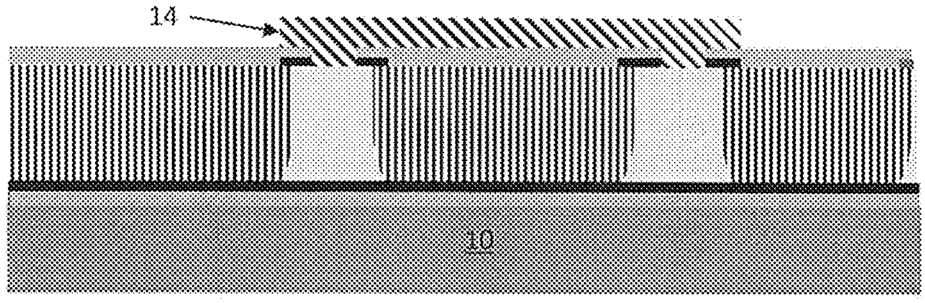
Figure 13G:
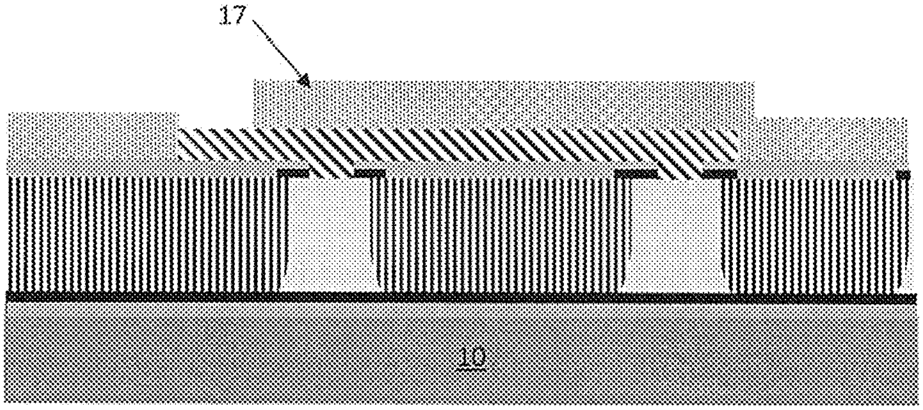
Figure 13H:
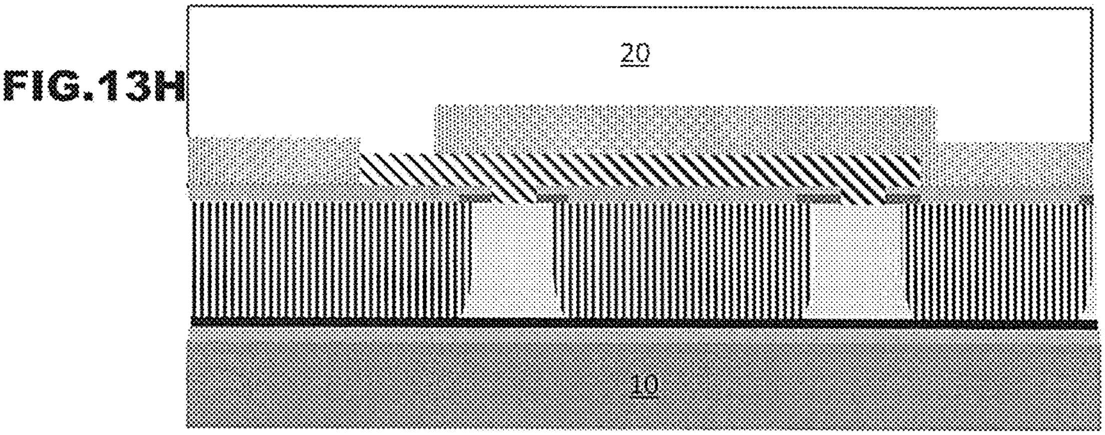
Figure 13J:
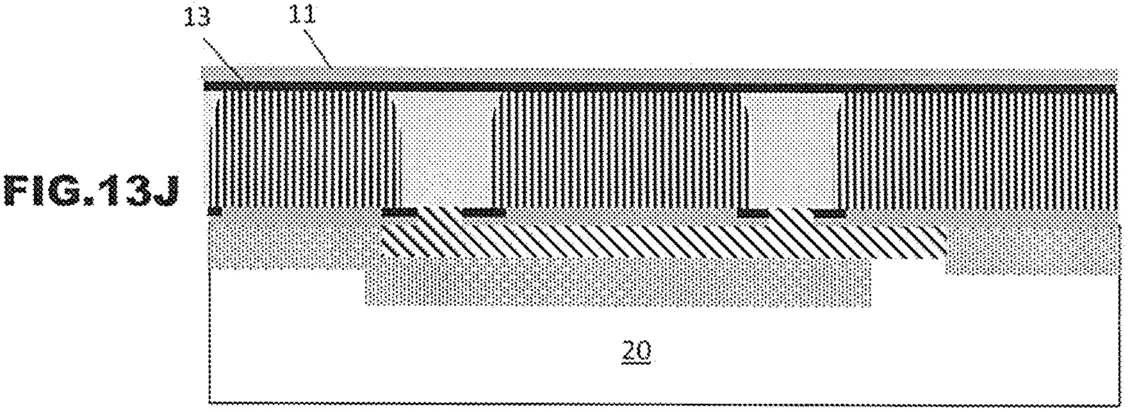
Figure 13K:
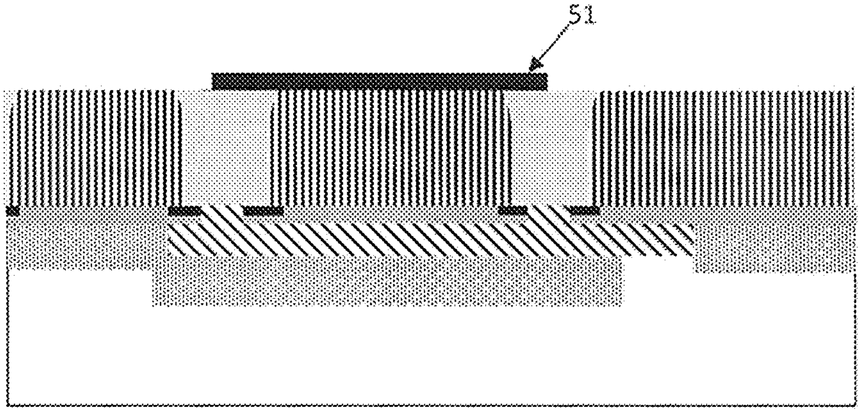
Figure 13L:
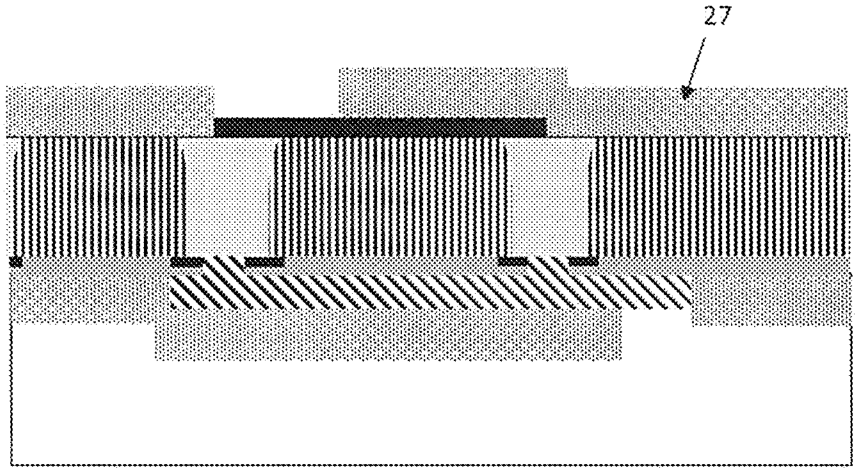
Figure 13M:
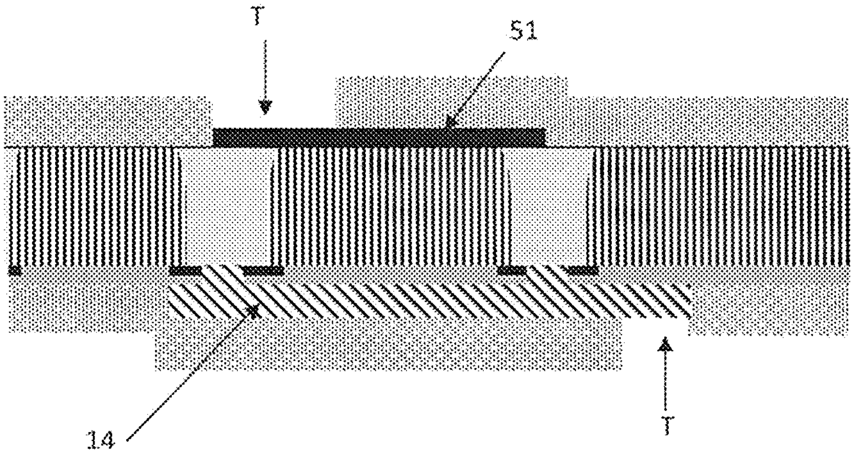

After the passivation 17 has been formed (as illustrated in FIG. 13G), a temporary carrier 20 is formed (S20) to support the structure, as illustrated in FIG. 13H. With the structure supported on the temporary carrier, 20, the substrate 10 is removed (S21), for example by grinding and etching using $SF_6$, to expose the insulating layer 11, as illustrated in FIG. 13J. The insulating layer 11 is removed (S22) and then the conductive layer 13 is patterned to create the underpath 51. Although the anodic etch-barrier layer is not shown in FIGS. 13A to 13H or FIGS. 13J to 13M, this layer is also patterned in step S23. A second passivation layer 27 is formed over the underpath 51 (S24) as illustrated in FIG. 13L. If desired, the temporary carrier 20 may now be removed (optional step S25), as illustrated in FIG. 13M, leaving exposed regions T where inductor terminals may be formed.

Although the present invention has been described above with reference to certain specific embodiments, it will be understood that the invention is not limited by the particularities of the specific embodiments. Numerous variations, modifications and developments may be made in the specified embodiments within the scope of the appended claims.

The invention claimed is:

1. A nanomagnetic inductor core comprising:

a porous, electrically-insulating template having high-permeability material in the pores thereof to constitute elongated nanowires, wherein the elongated nanowires are segmented along their axial direction; and a segment of dielectric material interposed between adjacent segments of the high-permeability material along the axial direction of the nanowire.

2. The nanomagnetic inductor core according to claim 1, wherein each segment of the high-permeability material has a length, in the axial direction of the nanowire, no greater than a size of a single magnetic domain.

3. The nanomagnetic inductor core according to claim 1, wherein a maximal cross-sectional dimension of the nanowire is no greater than a size of a single magnetic domain.

4. The nanomagnetic inductor core according to claim 1, wherein each segment of the high-permeability material includes segments made of one or more materials selected in the group of Zn, Fe, Ni, Co, Mn, Cr, mixtures and alloys thereof, permalloy, ZrO and CoZr.

5. The nanomagnetic inductor core according to claim 1, wherein the porous, electrically-insulating template is made of porous anodic aluminum oxide or another porous dielectric material.

6. The nanomagnetic inductor core according to claim 1, wherein the porous, electrically-insulating template is made of a porous dielectric material.

7. An inductor comprising:

a first conductor;

a second conductor; and the nanomagnetic inductor core according to claim 1, wherein the first conductor and the second conductor are electrically interconnected to encircle the nanomagnetic inductor core.

8. The inductor according to claim 7, wherein the nanomagnetic inductor core is sandwiched between the first conductor and the second conductor, and the first conductor and the second conductor are electrically interconnected by via-hole conductors traversing the nanomagnetic inductor core.

9. An inductor comprising a three-dimensional coil wound around the nanomagnetic inductor core according to claim 1.

10. An inductor comprising:

the nanomagnetic inductor core according to claim 1; and a two-dimensional coil on a surface of the nanomagnetic inductor coil.

11. An inductor comprising:

a first nanomagnetic inductor core comprising the nanomagnetic inductor core according to claim 1;

a two-dimensional coil on a surface of the first nanomagnetic inductor core; and a second nanomagnetic inductor core on the two-dimensional coil at a side thereof remote from the first nanomagnetic inductor core.

12. An LC interposer comprising:

a substrate;

a capacitor comprising a nanoscale capacitive structure in pores of a first region within the substrate; and an inductor according to claim 5, wherein the nanowires of the nanocomposite inductor core are in pores of a second region in the substrate.

13. A method of fabricating a nanomagnetic inductor core, the method comprising:

forming elongated nanowires comprising high-permeability material in pores of an electrically-insulating porous template, the nanowires being segmented along their axial direction; and interposing a segment of dielectric material between adjacent segments of the high-permeability material along the axial direction of the nanowire.

14. The method of fabricating a nanomagnetic inductor core according to claim 13, wherein each segment of the high-permeability material has a length, in the axial direction of the nanowire, no greater than a size of a single magnetic domain.

15. The method of fabricating a nanomagnetic inductor core according to claim 13, wherein a maximal cross-sectional dimension of the nanowire is no greater than a size of a single magnetic domain.

* * * * *